Patented Sept. 29, 1936

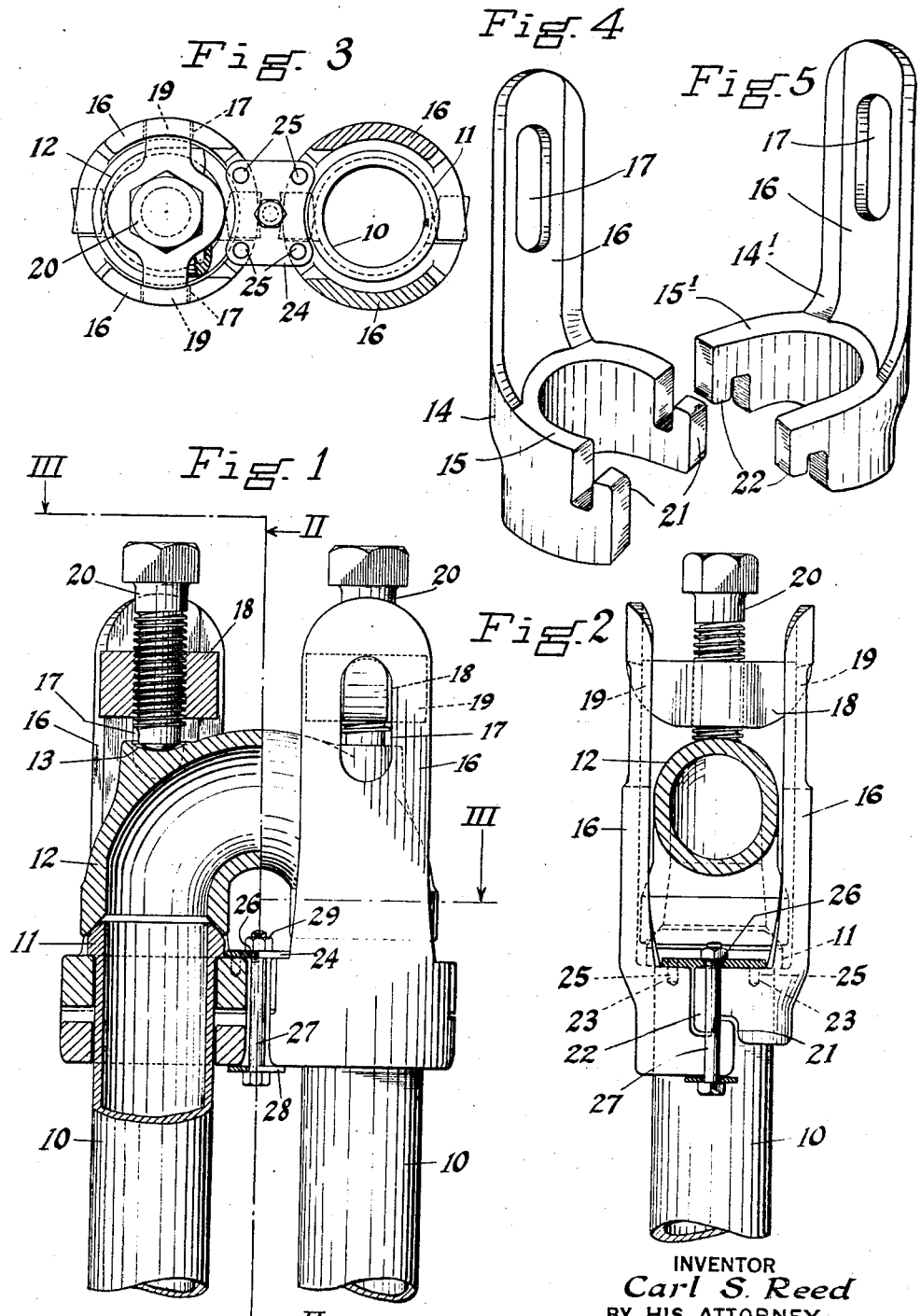

2,055,729

UNITED STATES PATENT OFFICE 2,055,729

PIPE COUPLING

Carl S. Reed, New York, N. Y., assignor to The Lummus Company, New York, N. Y., a corporation of Delaware Application June 23, 1932, Serial No. 618,873

15 Claims. (Cl. 285—20)

My invention relates to pipe couplings and particularly couplings which may be quickly and easily assembled and disassembled, and which will at the same time provide a secure and reliable joint between two pipe ends which is capable of withstanding high pressures within the pipes.

Among the objects of the invention may be mentioned the provision of a coupling of the type described which will be simple and which will comprise a small number of parts, and the provision of such a coupling, which although light in structure will be strong, reliable in action and easy to apply to pipe ends.

The invention is shown by way of illustration in the accompanying drawing wherein—

Figure 1 is an elevation partly in section showing the invention as applied to a return bend which connects adjacent ends of two parallel pipes, Fig. 2 is a section on the line II—II of Figure 1, Fig. 3 is a plan view of the construction shown in Figure 1, one-half being in section on the line III—III of Figure 1, Fig. 4 is a perspective view of one element of the coupling, and Fig. 5 is a perspective view of a second element of the coupling which coacts with the element illustrated in Fig. 4.

Although the invention is here shown as applied to a return bend, it will be realized that its use is not limited to return bends.

Referring particularly to the drawing, it will be seen that it illustrates a coupling for two pipes, one of them being shown as a pipe 10 having a shoulder 11 thereon, and the other an unshouldered pipe here shown as a return bend 12, which has an external seat 13 thereon. Clearly the second pipe is not limited to a return bend.

The coupling comprises two shouldered elements 14, 14', forming a split yoke which can be put in place over the shouldered end of a pipe. The shoulder 15, 15' on each element is adapted to engage the shoulder 11 on the pipe 10 for exerting pressure thereon. Each shouldered element has an extension 16 which may be formed integrally therewith extending away from the shoulder 15, and away from the shoulder 11 on the end of the pipe 10 when the coupling is in engagement. Openings 17 are provided in the extensions 16, and means are employed for exerting pressure upon the seat 13 on the second pipe, here shown as the return bend 12, and upon the shouldered elements 14, 14' forming the coupling. This means is illustrated as a removable part or block 18 which is adapted for engagement with the coupling by having its ends 19, 19 projecting through the openings 17, 17 in the extensions 16 on the shouldered elements 14, 14'. The block 18 has a threaded hole through its middle and a bolt 20 is provided which turns in the block 18 and bears against the seat 13 especially provided for its end in the return bend 12. By screwing down the bolt, pressure is exerted against the return bend which acts in one direction and an opposite pressure is exerted against the block 18 which is transmitted to the shouldered elements 14, 14', and thence to the shoulder 11 on the pipe 10. Thus, by tightening the bolt 20 which is threaded in the block 18, the pipe ends are drawn together, the two shouldered elements of the coupling exert a pressure toward the bolt upon the shoulder 11 of the pipe 10, and the bolt end exerting an opposite pressure upon the return bend 12.

Since the shoulder 15 of the shouldered element 14 and the shoulder 11 of the pipe 10 are each square and extend in a plane at right angles to the force exerted by the bolt 20, there is but a small horizontal component of this force acting upon the pipe 10 or the shouldered elements 14, 14' when the connection has been made. However, there is a small moment produced because of the offset position of the extensions 16 with respect to the contacting shoulders 15, 15', and to maintain the pairs of shouldered elements 14, 14' together when acting to hold the pipe ends against each other under practical conditions of service, means is provided to prevent separation of the two shouldered elements 14, 14'. This means is here illustrated as a pair of hooks 21 on the shouldered element 14 and a pair of hooks 22 on the shouldered element 14'. (See Figs. 4 and 5.) When the coupling is in place the hooks 21 engage the hooks 22 and the shouldered elements cannot be separated so long as the bolt 20 is screwed down.

Obviously the shouldered tube end may be given a spherical contour and may contact with an interior conical surface on the return bend; or any other convenient form of contact may be employed including the usual pipe flange and gasket contact, too well known to require illustration. Where the spherical pipe end and conical turn bend surface referred to above, are used in connection with a spherical end on the bolt 20 and a spherical seat 13 therefor, as illustrated, slight discrepancies in the dimensions of the parts are compensated for by adjustment in position of the elements without destroying the desired contact.

So far, the description has been directed to a single coupling and a single connection between pipe ends. A glance at Figure 1, however, will indicate that a similar connection is made by means of similar parts at the other end of the return bend.

To improve the coaction between the two separate couplings I may provide joining means to prevent their rotation with respect to each other. Such joining means is indicated in the drawing and will now be described, although I do not wish to be limited to its use. In this construction two holes 23 are formed in the adjacent portions of the shoulders 15 of the separate couplings and two corresponding holes are formed in the adjacent portions of the shoulders 15'. A plate 24 is provided having four dowels 25 projecting therefrom, these dowels being of a size to fit closely within the holes 23 and being spaced to enter these holes when the return bend 12 is coupled to the ends of the two pipes 10. (See Fig. 3.) A hole 26 is provided through the center of the plate 24 and a bolt 27 passing through a washer 28 which bears upon the lower edges of the shouldered elements 14, 14' passes between the shouldered elements on adjacent pipes and through the hole 26, a nut 29 serving to tighten the bolt between the washer 28 and the plate 24, thus holding the dowels 25 within the holes 23. The connection just described is employed to prevent turning of the couplings as the bolts 20 are tightened, which turning would tend to bind the shouldered elements 14, 14' against the return bend making the junction between the pipes uncertain.

By means of the present invention, when applied to return bend constructions, a single pipe may be quickly and effectively removed and replaced without disturbing adjacent pipes or the connection of any return bend with adjacent pipes.

In order to permit easy coupling or uncoupling of one pipe while leaving elements of adjacent couplings in engaged position, the ends of the shouldered elements carrying the hooks 21 and 22 are spread outwardly from the arc of the circle embracing the rest of the coupling. It is thus possible to remove the elements of one coupling by loosening the bolt 20, sliding the shouldered element 14 downwardly of the pipe 10 until the hooks 21 thereon are disengaged and then moving this shouldered element a minimum distance from the corresponding pipe 10 before withdrawing it in a general direction which is away from the corresponding coupled pipe. The amount of contact with the shoulder 11 on the pipe 10 which is lost by so shaping the ends of the shouldered elements is very slight, and it is preferred to sacrifice this slight area of contact in order to obtain the advantages just described.

The example here given and the particular description set forth are merely presented in order to illustrate how the invention may be applied. Other forms and variations, coming within the proper scope of the appended claims, will readily suggest themselves to those skilled in the pipe art.

With this understanding, I claim:

1. A pipe connection comprising two pipes each having a shoulder adjacent its end, a return bend, and a coupling joining each pipe end with an end of the return bend, each of said couplings comprising two shouldered parts having a hole in the face of the shoulder constructed on each part to engage the shoulder on the corresponding pipe, in combination with a plate, and dowels in said plate adapted to fit into the holes in all of said shouldered parts, said plate and said dowels being adapted to prevent movement of the shouldered parts of each coupling relative to one another and to the shouldered parts of the other coupling.

2. A pipe connection comprising two pipes each having a shoulder adjacent its end, a return bend, and a coupling joining each pipe end with an end of said return bend, each of said couplings comprising two shouldered parts having a hole in the face of the shoulder constructed on each part to engage the shoulder on the corresponding pipe, in combination with means on the shouldered parts of each of said couplings to prevent lateral separation of the same, a plate, and dowels in said plate adapted to fit into the holes in all of said shouldered parts, said plate and said dowels being adapted to prevent movement of the shouldered parts of each coupling relative to one another and to the shouldered parts of the other coupling.

3. A pipe connection comprising a return bend and two shouldered pipe ends, in combination with separate shouldered couplings adapted to engage the shoulder on a pipe end, each shouldered coupling having a hole in its face in combination with a plate and dowel pins fastened in said plate adapted to enter the holes in said separate shouldered couplings, said plate and said dowel pins serving to prevent turning of the separate shouldered couplings and binding against said return bend.

4. A pipe connection comprising a return bend and two shouldered pipe ends, in combination with separate shouldered couplings adapted to engage the shoulder on a pipe end, each shouldered coupling having a hole in its face, in combination with a plate having a hole therethrough, dowel pins fastened in said plate adapted to enter the holes in said separate shouldered couplings, a bolt fastened through the hole in said plate, and a nut on said bolt, said bolt and said nut acting to tighten said plate upon said separate shouldered couplings, said plate and said dowel pins serving to prevent turning of the separate shouldered couplings and binding against said return bend.

5. In combination, a pair of tubes having shouldered ends, a return bend forming a flow connection therebetween, housings for holding said tubes in communication with opposite ends of said return bend, each housing comprising two complementary sections, each section having a shouldered portion partly encircling the corresponding tube and contacting with the shoulder on said tube, and integral projections at opposite ends of said shouldered portion detachably interlocking with cooperating projections on the shouldered portion of the complementary section to prevent lateral separation of said housing sections.

6. In combination, a pair of tubes having shouldered ends, a return bend forming a flow connection therebetween, housings for holding said tubes in communication with opposite ends of said return bend, each housing comprising two complementary sections, each section having a shouldered portion partly encircling the corresponding tube and contacting with the shoulder on said tube, and integral projections at opposite ends of said shouldered portion detachably interlocking with cooperating projections on the shouldered portion of the complementary section by a relative movement axially of said tube to prevent lateral separation of said housing sections.

7. In combination, a pair of tubes having shouldered ends, a return bend forming a flow connection therebetween, housings for holding said tubes in communication with opposite ends of said return bend, each housing comprising two complementary sections, each section having a shouldered portion partly encircling the corresponding tube and contacting with the shoulder on said tube, integral projections at opposite ends of said shouldered portion detachably interlocking with cooperating projections on the shouldered portion of the complementary section by a relative movement axially of said tube to prevent lateral separation of said housing sections, and means engaging said shouldered portions for preventing relative movement of said sections axially of said tube.

8. In combination, a pair of tubes having shouldered ends, a return bend forming a flow connection therebetween, housings for holding said tubes in communication with opposite ends of said return bend, each housing comprising two complementary sections, each section having a shouldered portion partly encircling the corresponding tube and contacting with the shoulder on said tube, integral projections at opposite ends of said shouldered portion detachably interlocking with cooperating projections on the shouldered portion of the complementary section to prevent lateral separation of said housing sections, and means engaging the shouldered portions of the sections of both of said housings for preventing relative movement of any of said sections.

9. In combination, a pair of tubes having shouldered ends terminating in a spherical end surface, a return bend forming a flow connection between said tubes and having conical end surfaces in a line contact with said tube end surfaces, housings for holding said tubes in communication with opposite ends of said return bend, each housing comprising two complementary sections, each section having a substantially semi-circular shouldered portion contacting with the shoulder on the corresponding tube, and an integral hook-shaped lug on each end of said shouldered portion detachably interlocking with a similarly shaped oppositely extending lug on the adjacent end of the shouldered portion of the complementary section by a relative movement of said sections axially of said tube.

10. In a refinery apparatus, a conventional return bend adapted to connect a pair of shouldered steel tubes, a compound housing comprising a pair of sections having inwardly extending arcuate shoulders adapted to engage beneath said shoulders on the tube, inter-engaging means on said mating sections adapted to be disengaged by the longitudinal movement of the sections and detachable means to prevent the disengagement of said engaging means when the return bend is removed.

11. In a return bend assembly for pipe stills, in which a return bend interconnects a pair of adjacent tubes to form a continuous coil, said tubes having enlarged shouldered portions at the ends thereof, clamping devices for holding the return bend to the tubes, comprising a compound housing for the return bend provided with clasps forming split rings which fit around the ends of the tubes and engage said shouldered portions on said tubes, interengaging means on abutting edges of said sections to hold them together, said means being adapted to be disengaged by the longitudinal movement of the sections.

12. In combination, a tube having a shouldered end portion, a second tube adapted to be connected thereto, means for connecting said tubes comprising a pair of complementary housing sections having end portions fitting around the end of said first tube and engaging the shouldered portion thereof and side portions extending along opposite sides of said second tube, means on each housing section arranged to detachably interlock with the corresponding means on the complementary section by a relative longitudinal movement thereof, and thrust means arranged to exert a thrust in opposite directions on said housing sections and said second tube to hold the tubes in connected relation.

13. In combination, a tube having a shouldered end portion, a second tube adapted to be connected thereto, means for connecting said tubes comprising a pair of complementary housing sections having end portions fitting around the end of said first tube and engaging the shouldered portion thereof, and cooperating hook members on the abutting faces of said housing sections arranged to detachably interlock by a relative movement of said housing sections axially of said first tube.

14. In combination, a tube having a shouldered end portion, a return bend adapted to be connected thereto, means for connecting said tube and return bend comprising a pair of complementary housing sections having end portions fitting around the end of said tube and engaging the shouldered portion thereof, oppositely directed hook members on the abutting faces of said housing sections arranged to detachably interlock by a relative movement axially of said tube, and thrust means engaging said housing sections and return bend to hold said tube and return bend in connected relation.

15. A tube coupling comprising a pair of complementary housing sections having portions constructed to fit around the end of a shouldered tube and engage the shouldered portion thereof, and oppositely directed cooperating hook members on said housing sections constructed to interlock and disengage by relative movements axially of the tube.

CARL S. REED.